(12) United States Patent
Obrador

(10) Patent No.: US 8,718,381 B2
(45) Date of Patent: May 6, 2014

(54) METHOD FOR SELECTING AN IMAGE FOR INSERTION INTO A DOCUMENT

(75) Inventor: Pere Obrador, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1992 days.

(21) Appl. No.: 11/496,146

(22) Filed: Jul. 31, 2006

(65) Prior Publication Data

US 2008/0030752 A1 Feb. 7, 2008

(51) Int. Cl.
*G06K 9/64* (2006.01)

(52) U.S. Cl.
USPC ............ 382/217; 382/100; 382/162; 358/1.9; 358/518

(58) Field of Classification Search
USPC ................ 382/100, 162, 217; 358/1.9, 518
See application file for complete search history.

(56) References Cited

U.S. PATENT DOCUMENTS

| | | | | |
|---|---|---|---|---|
| 5,311,212 | A * | 5/1994 | Beretta | 345/591 |
| 5,473,738 | A | 12/1995 | Hamlin et al. | |
| 5,802,361 | A * | 9/1998 | Wang et al. | 382/217 |
| 6,130,956 | A * | 10/2000 | Butterworth et al. | 382/100 |
| 6,285,468 | B1 | 9/2001 | Cok et al. | |
| 6,987,535 | B1 | 1/2006 | Matsugu et al. | |
| 7,072,495 | B2 | 7/2006 | Harrington et al. | |
| 2003/0063099 | A1 | 4/2003 | Sadka | |
| 2003/0113035 | A1 | 6/2003 | Cahill et al. | |
| 2004/0101156 | A1 * | 5/2004 | Kacker | 382/100 |
| 2004/0252303 | A1 * | 12/2004 | Giorgianni et al. | 356/402 |
| 2005/0071755 | A1 | 3/2005 | Harrington et al. | |

FOREIGN PATENT DOCUMENTS

| | | |
|---|---|---|
| EP | 1100262 | 5/2001 |
| EP | 1555634 | 7/2005 |

OTHER PUBLICATIONS

Obrador, Pere "Automatic color scheme picker for document templates based on image analysis and dual problem" SPIE Digital Publishing Conference, San Jose, CA, Jan. 2006.
Anonymous: "ColorLab: Color Harmony" [Online] May 2, 2005 XP002462302, Retrieved from the Internet <http://colorlab.webespacios.com/colorharmony.php> on Dec. 10, 2007, whole 3pgs.
PCT Search Report & Written Opinion for PCT/US2007/017106, Jan. 23, 2008.
Abstract of The Geneal Principles, and Methods of the Harmony of Colors, Weiwei, Lishui University Feb. 2006, vol. 28 No. 1, pp. 5-7.

* cited by examiner

*Primary Examiner* — Chan Park
*Assistant Examiner* — Eueng-Nan Yeh

(57) ABSTRACT

One embodiment of the present invention provides a method for selecting an image for insertion into a document. A color harmony is received. A document color data of the document is accessed. An image color data of each of a plurality of images is accessed. A harmony measure is determined between the document color data and each of the image color data according to the color harmony.

11 Claims, 4 Drawing Sheets

METHOD FOR SELECTING AN IMAGE FOR INSERTION INTO A DOCUMENT

CROSS-REFERENCE TO RELATED APPLICATIONS

This Utility Patent Application is related to U.S. patent application Ser. No. 11/495,846, entitled "IMAGE PROCESSING METHODS, IMAGE MANAGEMENT SYSTEMS, AND ARTICLES OF MANUFACTURE," filed Jul. 27, 2006, which is incorporated herein by reference.

BACKGROUND

When inserting images into a document, a person can choose the image based on a number of aesthetic factors. One such factor is color harmony, which refers to a given relationship between colors. The color harmony provides a repeatable guideline or rule through which an image can be chosen based on the relationship between the color(s) of the image and the color(s) of the surrounding document.

Given a pool of images, a person will typically browse through each image and manually determine which images best match a given color harmony. When, for example, the image pool is large, the task of choosing an image can be tedious, time-consuming, and subject to human error. For these and other reasons, there is a need for the present invention.

SUMMARY

One embodiment of the present invention provides a method for selecting an image for insertion into a document. A color harmony is received. A document color data of the document is accessed. An image color data of each of a plurality of images is accessed. A harmony measure is determined between the document color data and each of the image color data according to the color harmony.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention include a system and method for selecting one or more images (hereinafter "the selected image") to be inserted into a document. The selected image is selected from a plurality of images (hereinafter "the image group"). In one embodiment, the image group is stored in an image database. The selected image is selected from the image group based on a specified relationship between the document and the selected image. In one embodiment, the specified relationship is a color harmony.

Figure 1:
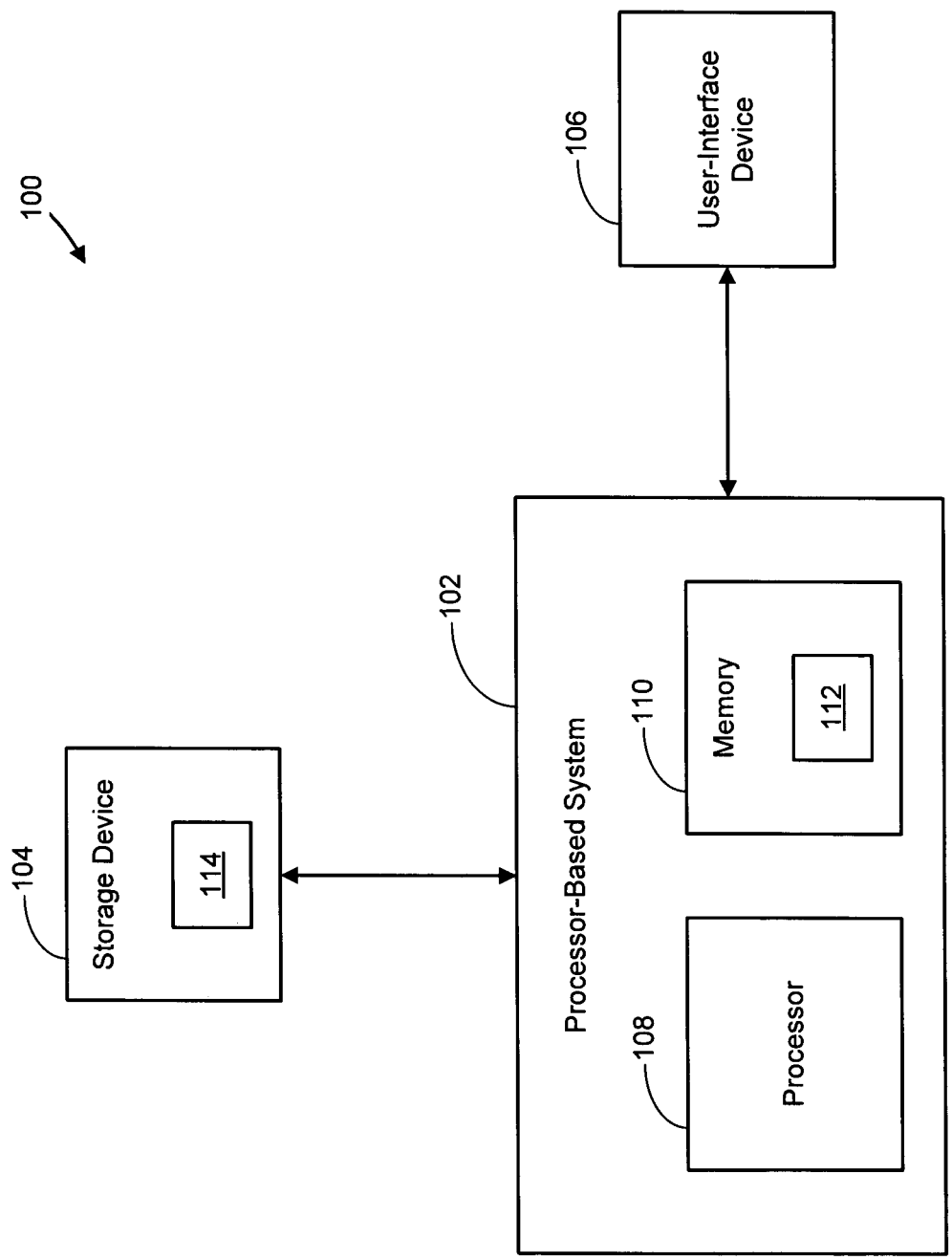
FIG. 1 is a block diagram of an image selection device illustrating one embodiment of the invention.

FIG. 1 is a block diagram of an image selection device 100 illustrating one embodiment of the invention. Image selection device 100 includes a processor-based system 102, a storage device 104, and a user-interface device 106. Processor-based system 102 communicates bi-directionally with storage device 104 and user-interface device 106. In one embodiment, processor-based system 102 communicates with storage device 104 and/or user-interface device 106 via a network, such as the Internet.

Processor-based system 102 includes a processor 108 and a memory 110. In one embodiment, processor-based system 102 is a computer. In another embodiment, processor-based system 102 is a server. Processor 108 communicates bi-directionally with memory 110. Memory 110 includes any suitable storage media located internally or externally with respect to processor-based system 102. Memory 110 includes an image selection method 112. In one embodiment, image selection method 112 is a software program stored on memory 110 and executed by processor 108. In other embodiments, image selection method 112 is any suitable form of hardware, firmware, or software.

Storage device 104 includes an image group 114. Storage device 104 is any suitable storage media. In another embodiment, image group 114 is included in memory 110. Image group 114 includes a plurality of images. In one embodiment, image group 114 is a database.

User-interface device 106 provides one or more tools for a user to communicate with processor-based system 102. In one embodiment, user-interface device 106 includes an input device, such as a keyboard and/or a mouse, and an output device, such as a computer monitor. In another embodiment, user-interface 106 includes another processor-based system (not shown) for communicating with processor-based system 102 via a network, such as the Internet.

Figure 2:
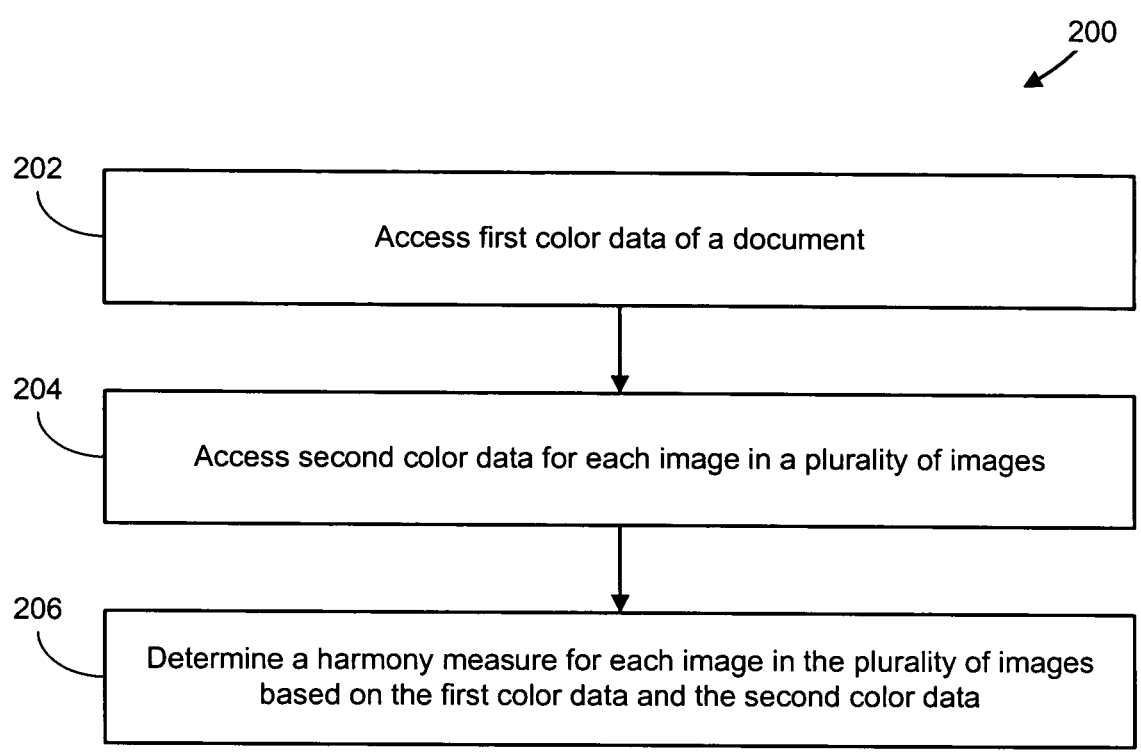
FIG. 2 is a flow diagram of a method of selecting an image illustrating one embodiment of the invention.

FIG. 2 is a flow diagram of a method 200 of selecting an image illustrating one embodiment of the invention. Method 200 involves determining the relationship between a document and an image to be inserted into the document with respect to a given color harmony. This relationship can be used to choose which image from a plurality of images best fits the document.

First color data of a document is accessed (at 202). Second color data for each image of a plurality of images is accessed (at 204). In one embodiment, the first color data and the second color data include RGB data. In other embodiments, the first color data and the second color data include data of any suitable color space, such as LAB, YUV, or YCC, capable of being utilized by image selection device 100. In one embodiment, the first color data excludes color data from the portion of the document where the selected image is to be inserted.

In one embodiment, the first color data and the second color data are obtained through the morphological processing described in "IMAGE PROCESSING METHODS, IMAGE MANAGEMENT SYSTEMS, AND ARTICLES OF MANUFACTURE," which was incorporated herein by reference, supra. The morphological processing identifies plural regions of the images having a consistent or common characteristic. In one embodiment, the consistent or common characteristic identified by the morphological processing is a lexical color.

A harmony measure is determined (at 206) for each image in the plurality of images based on the first color data of the document and the second color data of each image. The harmony measure is a measure of the relationship between the first color data and the second color data with respect to a given color harmony. In one embodiment, a higher harmony measure indicates that the relationship between the first color data and the second color data more closely follows the given color harmony. In other embodiments, the harmony measure is any suitable indicator of the relationship between the first color data and the second color data with respect to the given color harmony.

The method of determining the harmony measure can differ depending on the given color harmony. The invention is capable of utilizing any suitable color harmony. Exemplary color harmonies include complementary, split complimentary, triadic, affine (i.e., analogous), clash and monochromatic.

In one embodiment, a user is provided a list of the images with the harmony measures indicative of the closest relationships between the first color data and the second color data with respect to the given color harmony. In another embodiment, the list of the images is ranked with respect to the harmony measures. In this way, the user does not have to search the plurality of images to find the images that relate to the given color harmony. The user can insert different images from the list into the document to determine which image best fits the document.

In another embodiment, the image or images with the harmony measures indicative of the closest relationships between the first color data and the second color data with respect to the given color harmony are inserted into the document or documents. In another embodiment, the document or documents with the inserted image or images are ranked with respect to the harmony measures. In this way, the user is provided with one or more suggestions as to the image that best fits the document. The user can view the one or more suggestions to determine which suggestion looks best.

Figure 3:
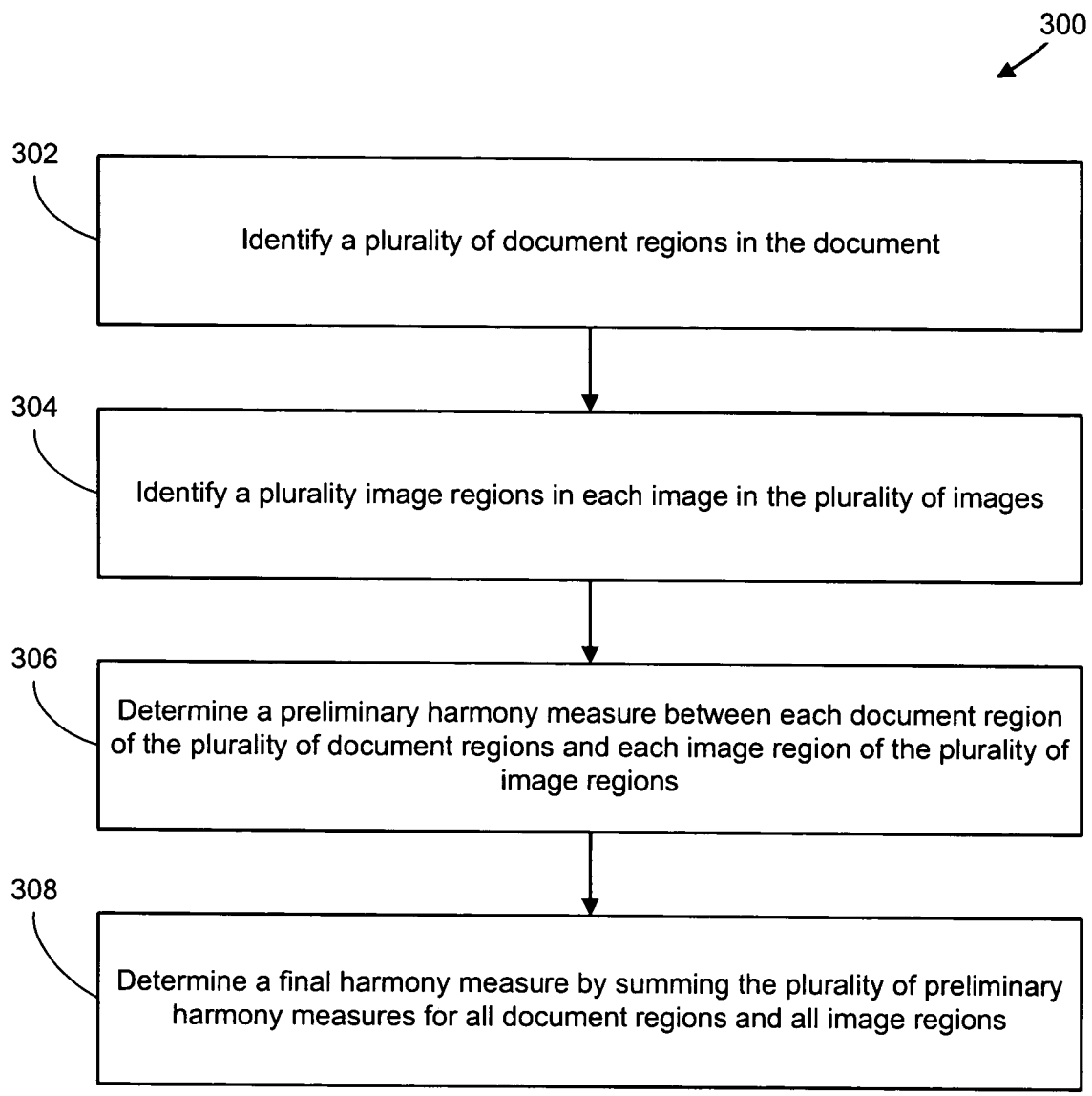
FIG. 3 is a flow diagram of a method of selecting an image illustrating another embodiment of the invention.

FIG. 3 is a flow diagram of a method 300 of selecting an image illustrating another embodiment of the invention. Method 300 involves determining the relationship between a document and an image to be inserted into the document with respect to a given color harmony. This relationship can be used to choose which image from a plurality of images best fits the document.

A plurality of document regions are identified (at 302) in the document. In one embodiment, the plurality of document regions are identified in the document based on morphological processing of the document. A plurality of image regions are identified (at 304) in each image in a plurality of images.

In one embodiment, the plurality of image regions are identified in each image based on morphological processing of each image.

In one embodiment, each document region and each image region is associated with color data of a suitable color space, such as RGB, LAB, YUV, or YCC. As previously noted, morphological processing is described in "IMAGE PROCESSING METHODS, IMAGE MANAGEMENT SYSTEMS, AND ARTICLES OF MANUFACTURE." In one embodiment, each document region and each image region is associated with one of twenty-five (25) lexical colors.

A preliminary harmony measure is determined (at 306) between each document region of the plurality of document regions and each image region of the plurality image regions, based on one or more characteristics of the plurality of document regions and the plurality of image regions. Exemplary characteristics include the size of the document region, the size of the image region, the distance between the document region and the image region, and the difference in color between the document region and the image region.

In one embodiment, the preliminary harmony measure is determined by the following.

$$\text{harmony\_measure}_{ij} = \text{bin\_factor} * \frac{\sqrt{patchSize_i * patchSize_j}}{(1 + centroidDist_{ij}) * (1 + (colorDist_{ij})^4)}$$

$$centroidDist_{ij} = \sqrt{(centroidX_i - centroidX_j)^2 + (centroidY_i - centroidY_j)^2}$$

$$colorDist_{ij} = \sqrt{(averageL_i - averageL_j)^2 + (averageA_i - averageA_j)^2 + (averageB_i - averageB_j)^2}$$

The harmony_measure$_{ij}$ refers to the preliminary harmony measure for a given document region i and a given image region j. The bin_factor reduces the harmony_measure$_{ij}$ if the document region i and the image region j are different colors. The bin_factor is 1 if the document region i and the image region j are the same color. The bin_factor is between 0.5 and 1 if the document region i and the image region j are different colors. In one embodiment, the bin_factor is 0.75 if the document region i and the image region j are different colors. In other embodiments, the bin_factor is any suitable value between 0 and 1, inclusive.

The patchSize$_i$ refers to the size of the document region i, and the patchSize$_j$ refers to the size of the image region j. In one embodiment, patchSize$_i$ and patchSize$_j$ refer to the area of the document region i and the area of the image region j, respectively.

The centroidDist$_{ij}$ refers to the distance between the document region i and the image region j. It is assumed for purposes of determining the centroidDist$_{ij}$ that the image in which image region j is located is scaled and inserted into the document region i. The centroid of the document region i and the centroid of the image region j are each identified by a physical coordinate (X, Y). The centroidX$_i$ refers to the X coordinate of the centroid of the document region i, and the centroidX$_j$ refers to the X coordinate of the centroid of image region j. The centroidY$_i$ refers to the Y coordinate of the centroid of the document region i, and the centroidY$_j$ refers to the Y coordinate of the centroid of the image region j. In other embodiments, the centroidDist$_{ij}$ is any suitable determination of the distance between document region i and image region j.

The colorDist$_{ij}$ refers to the difference between the lexical color of the document region i and the lexical color of the image region j. In one embodiment, colorDist$_{ij}$ refers to the distance between the lexical color of the document region i and the lexical color of the image region j along a color wheel. In another embodiment, colorDist$_{ij}$ refers to the angular difference between the lexical color of the document region i and the lexical color of the image region j along a color wheel. The invention can utilize any suitable color wheel. Exemplary color wheels include the RYB (red/yellow/blue) and the CMY (cyan/magenta/yellow).

The colorDist$_{ij}$ utilizes the LAB color space. The LAB color space includes three color values: L*, a*, and b*. Combinations of the three color values, L*, a*, and b*, are used to represent a color. The averageL$_i$ refers to the average of the L* values of the document region i, and the averageL$_j$ refers to the average of the L* of the image region j. The averageA$_i$ refers to the average of the a* values of the document region i, and the averageA$_j$ refers to the average of the a* values of the image region j. The averageB$_i$ refers to the average of the b* values of the document region i, and the averageB$_j$ refers to the average of the b* values of the image region j. In other embodiments, the colorDist$_{ij}$ utilizes RGB, YUV, YCC, or any suitable color space.

The harmony_measure$_{ij}$ is inversely related to the colorDist$_{ij}$. That is, as the colorDist$_{ij}$ increases, the harmony_measure$_{ij}$ decreases, and as the colorDist$_{ij}$ decreases, the harmony_measure$_{ij}$ increases. A higher harmony_measure$_{ij}$ indicates the relationship between the lexical color of the document region i and the lexical color of the image region j more closely follows the affine color harmony, the monochromatic color harmony, or any suitable color harmony requiring colors close to each other on the color wheel. A lower harmony_measure$_{ij}$ indicates the relationship between the lexical color of the document region i and the lexical color of the image region j more closely follows the complementary color harmony, the split complementary color harmony, or any suitable color harmony requiring colors far from each other on the color wheel.

In another embodiment, a preliminary harmony measure utilizes a direct relationship between the harmony_measure$_{ij}$ and the colorDist$_{ij}$. That is, as the colorDist$_{ij}$ increases, the harmony_measure$_{ij}$ increases, and as the colorDist$_{ij}$ decreases, the harmony_measure$_{ij}$ decreases. A lower harmony_measure$_{ij}$ indicates the relationship between the lexical color of the document region i and the lexical color of the image region j more closely follows the affine color harmony, the monochromatic color harmony, or any suitable color harmony requiring colors close to each other on the color wheel. A higher harmony_measure$_{ij}$ indicates the relationship between the lexical color of the document region i and the lexical color of the image region j more closely follows the complementary color harmony, the split complementary color harmony, or any suitable color harmony requiring colors far from each other on the color wheel.

Figure 4:
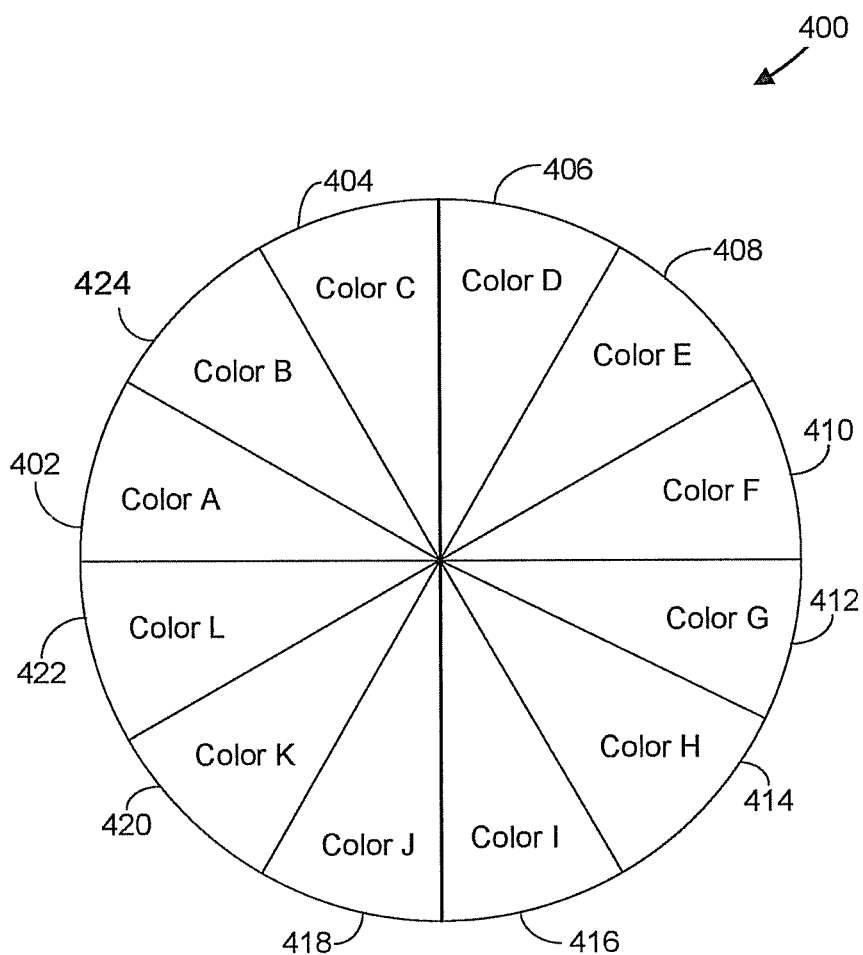
FIG. 4 is a diagram of a color wheel illustrating one embodiment of the invention.

In another embodiment, a preliminary harmony measure utilizes an inverse relationship between the harmony_measure$_{ij}$ and the colorDist$_{ij}$, and substitutes the lexical color of the document region i with a color corresponding to a given color harmony when determining the colorDist$_{ij}$. Consider, for example, a split complementary color harmony. FIG. 4 is a diagram of a color wheel 400 illustrating one embodiment of the invention. Color wheel 400 includes twelve colors 402-424. In other embodiments, color wheel 400 includes any suitable number of colors. The split complementary color harmony requires the two colors adjacent to the complement of a given color along the color wheel. If, for example, the given color is color A 402, then the split complementary colors are color F 410 and color H 414.

The given color is the lexical color of the document region i. The two split complementary colors are determined from the given color. For purposes of determining the colorDist$_{ij}$, the lexical color of document region i is substituted with each of the two split complementary colors. If, for example, the given color is color A 402, then the colorDist$_{ij}$ is calculated two times: (1) between color F 410 and the lexical color of the image region j, and (2) between color H 414 and the lexical color of the image region j. In one embodiment, the smallest of the two values is chosen to represent colorDist$_{ij}$ in determining the harmony_measure$_{ij}$.

A higher harmony_measure$_{ij}$ indicates the relationship between the lexical color of the document region i and the lexical color of the image region j more closely follows the given color harmony. A lower harmony_measure$_{ij}$ indicates the relationship between the lexical color of the document region i and the lexical color of the image region j less closely follows the given color harmony.

In another embodiment, a preliminary harmony measure utilizes a weighting function instead of the colorDist$_{ij}$. In one embodiment, the weighting function is directly related to the harmony_measure$_{ij}$. Given the lexical color of the document region i, the colors corresponding to the given color harmony are weighted more heavily than the colors not corresponding to the given color harmony. Consider, for example, a split complementary color harmony.

Referring to FIG. 4, if the lexical color of the document region i is color A 402, then the lexical color of the image region j should be one of the two split complementary colors, color F 410 and color H 414. Thus, color F 410 and color H 414 are weighted more heavily than the other colors on the color wheel 400.

If the lexical color of the image region j is a color corresponding to the given color harmony, the weighting function is a higher value resulting in a higher harmony_measure$_{ij}$. If the lexical color of the image region j is a color not corresponding to the given color harmony, the weighting function is a lower value resulting in a lower harmony_measure$_{ij}$. In another embodiment, the weighting function is inversely related to the harmony_measure$_{ij}$.

Referring again to FIG. 3, a final harmony measure is determined (at 308) by summing the plurality of preliminary harmony measures for all document regions i (i.e., i=1, 2, ... [through the number of document regions]) and all image regions j (i.e., j=1, 2, ... [through the number of image regions]) for each image in the plurality of images. In one embodiment, the final harmony measure is determined by the following.

$$\text{final\_harmony\_measure}_m = \sum_{i \in document} \sum_{j \in image} \text{harmony\_measure}_{i,j}$$

The final_harmony_measure$_m$ refers to the final harmony measure for a given image m. In other embodiments, the final harmony measure is determined by any suitable manipulation of the preliminary harmony measures.

A higher final_harmony_measure$_m$ indicates the relationship between the color(s) of the document and color(s) of the image m more closely follows the given color harmony. A lower final_harmony_measure$_m$ indicates the relationship between the color(s) of the document and the color(s) of the image m less closely follows the given color harmony.

In one embodiment, a number of images with the highest harmony measures is provided to a user. In another embodiment, the number of images with the highest harmony measures are ranked and provided to the user. The user can insert different images from the provided images to determine which image best fits the document. In another embodiment, the image or images with the highest harmony measures are inserted into the document and provided to the user. In another embodiment, the image or images with the highest harmony measures are inserted into the document, ranked, and provided to the user.

Embodiments described and illustrated with reference to the Figures provide methods for selecting an image for insertion into a document. It is to be understood that not all components and/or steps described and illustrated with reference to the Figures are required for all embodiments. In one embodiment, one or more of the illustrative methods are preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for selecting an image for insertion into a document, comprising:
    receiving a color harmony;
    identifying a plurality of document regions;
    identifying a plurality of image regions; and
    determining by a processor a preliminary harmony measure between each of the plurality of document regions and each of the plurality of image regions according to the color harmony, including determining the preliminary harmony measure based on the difference in color between the each of the plurality of document regions and the each of the plurality of image regions with respect to the color harmony, the size of the each of the plurality of document regions, the size of the each of the plurality of image regions, and the distance between the each of the plurality of document regions and the each of the plurality of image regions.

2. The method of claim 1, wherein identifying a plurality of document regions and identifying a plurality of image regions, comprises:
    identifying the plurality of document regions based on morphologically processing the document; and
    identifying the plurality of image regions based on morphologically processing the image.

3. The method of claim 1, further comprising:
    determining a final harmony measure by summing the preliminary harmony measures.

4. The method of claim 3, further comprising:
    repeating the steps of identifying a plurality of image regions, determining a preliminary harmony measure between each of the plurality of document regions and each of the plurality of image regions according to the color harmony, and determining a final harmony measure by summing the preliminary harmony measures for each of a plurality of images.

5. The method of claim 4, further comprising outputting at least a portion of the plurality of images associated with the final harmony measures indicative of closer relationships between the first color data and the second color data with respect to the color harmony.

6. The method of claim 5, wherein outputting at least a portion of the plurality of images associated with the final harmony measures indicative of closer relationships between the first color data and the second color data with respect to the color harmony comprises:
    outputting at least a portion of the plurality of images associated with the higher final harmony measures.

7. The method of claim 1, wherein receiving a color harmony comprises:
    receiving one of a monochromatic color harmony, an analogous color harmony, a complementary color harmony, a split-complementary color harmony, a triadic color harmony, and a clash color harmony.

8. The method of claim 1, wherein determining a preliminary harmony measure between each of the plurality of document regions and each of the plurality of image regions according to the color harmony comprises:
    determining the preliminary harmony measure based on the difference in color between the each of the plurality of document regions and the each of the plurality of image regions with respect to the color harmony.

9. The method of claim 1, wherein the preliminary harmony measure is determined according to $$\text{harmony\_measure}_{ij} = \text{bin\_factor} * \frac{\sqrt{patchSize_i * patchSize_j}}{(1 + centroidDist_{ij}) * (1 + (colorDist_{ij})^4)}$$

$$centroidDist_{ij} = \sqrt{(centroidX_i - centroidX_j)^2 + (centroidY_i - centroidY_j)^2}$$

$$colorDist_{ij} = \sqrt{(averageL_i - averageL_j)^2 + (averageA_i - averageA_j)^2 + (averageB_i - averageB_j)^2}$$

where the harmony_measure$_{ij}$ refers to the preliminary harmony measure for a given document region i and a given image region j;
    the bin_factor reduces the harmony_measure$_{ij}$ if the document region i and the image region j are different colors;
    the patchSize$_i$ refers to the size of the document region i and the patchSize$_j$ refers to the size of the image region j;
    the centroidDist$_{ij}$ refers to the distance between the document region i and the image region j;
    the centroidX$_i$ refers to the X coordinate of the centroid of the document region i;
    the centroidX$_j$ refers to the X coordinate of the centroid of image region j;
    the centroidY$_i$ refers to the Y coordinate of the centroid of the document region i;
    the centroidY$_j$ refers to the Y coordinate of the centroid of the image region j;
    the colorDist$_{ij}$ refers to the difference between the lexical color of the document region i and the lexical color of the image region j
    the averageL$_i$ refers to the average of the L* values of the document region i;

the averageL$_j$ refers to the average of the L* of the image region j;

the averageA$_i$ refers to the average of the a* values of the document region i;

the averageA$_j$ refers to the average of the a* values of the image region j;

the averageB$_i$ refers to the average of the b* values of the document region i; and the averageB$_j$ refers to the average of the b* values of the image region j.

10. The method of claim 9, wherein:

the bin_factor is 1 if the document region i and the image region j are the same color; and the bin_factor is between 0.5 and 1 if the document region i and the image region j are different colors.

11. The method of claim 9, wherein the patchSize$_i$ and the patchSize$_j$ refer to the area of the document region i and the area of the image region j, respectively.

* * * * *

UNITED STATES PATENT AND TRADEMARK OFFICE
CERTIFICATE OF CORRECTION

| | | |
|---|---|---|
| PATENT NO. | : 8,718,381 B2 | Page 1 of 1 |
| APPLICATION NO. | : 11/496146 | |
| DATED | : May 6, 2014 | |
| INVENTOR(S) | : Pere Obrador | |

It is certified that error appears in the above-identified patent and that said Letters Patent is hereby corrected as shown below:

In the Claims:

In column 8, line 48, in Claim 9, delete "bin _factor" and insert -- bin_factor --, therefor.

In column 8, line 48, in Claim 9, delete "harmony _measure$_{ij}$" and insert -- harmony_measure$_{ij}$ --, therefor.

In column 8, line 57, in Claim 9, after "centroid of" insert -- the --.

In column 9, line 12, in Claim 10, delete "bin _factor" and insert -- bin_factor --, therefor.

In column 9, line 14, in Claim 10, delete "bin _factor" and insert -- bin_factor --, therefor.

In column 9, line 16, in Claim 11, delete "patchSize," and insert -- patchSize$_i$ --, therefor.

Signed and Sealed this
Twenty-sixth Day of August, 2014

Michelle K. Lee
*Deputy Director of the United States Patent and Trademark Office*